(12) United States Patent
Kato

(10) Patent No.: US 7,842,151 B2
(45) Date of Patent: Nov. 30, 2010

(54) METHOD AND DEVICE FOR FORMING A LAYERED PRODUCT HAVING A BENT OVER EDGE

(75) Inventor: Hisaya Kato, Aichi (JP)

(73) Assignee: Katomokuzai Kogyo Co., Ltd., Kasugai-shi (JP)

( * ) Notice: Subject to any disclaimer, the term of this patent is extended or adjusted under 35 U.S.C. 154(b) by 556 days.

(21) Appl. No.: 11/911,742

(22) PCT Filed: Mar. 17, 2006

(86) PCT No.: PCT/JP2006/305440
§ 371 (c)(1), (2), (4) Date: Oct. 17, 2007

(87) PCT Pub. No.: WO2006/120800
PCT Pub. Date: Nov. 16, 2006

(65) Prior Publication Data
US 2008/0216945 A1    Sep. 11, 2008

(30) Foreign Application Priority Data
May 13, 2005 (JP) ............................. 2005-141913

(51) Int. Cl.
*B29C 65/48* (2006.01)
*B32B 37/02* (2006.01)
*A47B 13/08* (2006.01)

(52) U.S. Cl. .................. 156/211; 156/212; 156/257; 156/258; 156/268; 156/475; 156/510; 156/539; 52/782.2; 52/796.11

(58) Field of Classification Search .................. 156/211, 156/212, 257, 258, 268, 510, 200, 475, 517, 156/539; 52/782.2, 796.11; 144/345, 346, 144/350, 351, 352, 353
See application file for complete search history.

(56) References Cited

U.S. PATENT DOCUMENTS 3,841,369 A * 10/1974 Roche .................... 144/136.1

FOREIGN PATENT DOCUMENTS

| JP | 49 86507 | 8/1974 |
|----|----------|--------|
| JP | 54 70407 | 6/1979 |
| JP | 1 104305 | 7/1989 |
| JP | 1 178643 | 7/1989 |
| JP | 2002 52650 | 2/2002 |
| JP | 2004 358873 | 12/2004 |

* cited by examiner

*Primary Examiner*—Richard Crispino
*Assistant Examiner*—Barbara J. Musser
(74) *Attorney, Agent, or Firm*—Oblon, Spivak, McClelland, Maier & Neustadt, L.L.P.

(57) ABSTRACT

An apparatus for manufacturing a layered product having a curved surface part with an extremely small radius of curvature while lowering the rate of occurrence a defective product is provided. The manufacturing apparatus is for a layered product in which a decorative material is laminated on a surface and side of a base material, and includes a cutting unit for forming a first cut portion at the corner of the base material and forming a second cut portion having an arc-shaped portion at a portion of a rear surface side of the decorative material opposing to the first cutout part and a bending member for bending the decorative material at the circular arc-like part of the second cutout part.

6 Claims, 7 Drawing Sheets

METHOD AND DEVICE FOR FORMING A LAYERED PRODUCT HAVING A BENT OVER EDGE

TECHNICAL FIELD

The present invention relates to a layered product, a manufacturing apparatus and a manufacturing method therefor, and a cutting tool used in the manufacture thereof, and more specifically, relates to a layered product with which the ratio of having defective products is reduced and which makes it possible to obtain a layered product of which the curvature radius at the curved portion is extremely small, a manufacturing apparatus and a manufacturing method therefor, and a cutting tool used in the manufacture thereof.

BACKGROUND ART

A layered product that is publicly known according to the related art includes a base material such as one made of a particle board or the like and also a decorative material such as one made of a melamine resin or the like that is laminated on a surface and a side face of the base material. This type of layered product is popularly used as a building material for various types of counters, doors, floors, walls, and the like.

A method for manufacturing this type of layered product that is generally known is as follows. Firstly, a curving process is performed on a surface and a side face of the base material, and then a sanding finish is implemented. Next, the decorative material is adhered to the surface of the base material, and the decorative material is bent while being heated so that the decorative material adheres to the side face of the base material (This process is referred to as the "post form processing").

At times there is a demand that this type of layered product has, at the curved portion, a small curvature radius being equal to or smaller than 5 millimeters, depending on the intended use of the layered product. When the manufacturing method described above is used, however, because the decorative material made of a melamine resin or the like does not have flexibility, the curvature radius at the curved portion is arranged to be approximately 10 millimeters. Thus, the demand mentioned above is not met.

In order to solve the problem above, according to the related art, a manufacturing method of a layered product has been suggested in which, at first, a cornering side of a base material is cut so that a first cut portion is formed in the base material, whereas a rear surface side of a decorative material is cut so that a second cut portion is formed in the decorative material, and subsequently, the decorative material is bent at the second cut portion. (See, for example, Patent Document 1). According to this method, the thickness of the decorative material is arranged to be smaller so that it is more easily bent. Thus, it is possible to obtain a layered product of which the curvature radius at the curved portion is 2 to 3 millimeters.

According to the method disclosed in Patent Document 1, a cutting tool used for cutting the base material and the decorative material includes a cutting blade (a cutter 8) that has a first cutting plane (a cut portion cutting plane 9), a second cutting plane (a thin portion cutting plane 10) that intersects the first cutting plane, and a sloped plane that connects the first cutting plane to the second cutting plane (See, for example, FIG. 6 in Patent Document 1). Accordingly, according to the method disclosed in Patent Document 1, a corner portion at which the planes intersect each other is formed at the bending portion of the second cut portion in the decorative material. When the stress is concentrated at the corner portion, the decorative material gets damaged. Thus, the ratio of having defective products is extremely high in the current situation. In particular, in order to prevent the decorative material from having linear marks on its surface so as to avoid having a defective product, every time the curvature radius value of the curved portion of the layered product is to be altered, a cumbersome and complicated operation is required so that the positional arrangements of a guiding roller and a guiding pad that are used in the bending process can be finely adjusted. Further, this method requires that a space between the first cut portion in the base material and the second cut portion in the decorative material be filled with an adhesive agent, so that the adhesive agent exhibits a buffering function when the decorative material is bent.

Patent Document 1: JP-A 2004-358873

DISCLOSURE OF THE INVENTION

Problems to be solved by the Invention

In view of the current situation described above, the present invention aims to provide a layered product with which the ratio of having defective products is reduced and which makes it possible to obtain a layered product of which the curvature radius at the curved portion is extremely small, a manufacturing apparatus and a manufacturing method therefor, and a cutting tool used in the manufacture thereof.

Means for Solving Problems

The present invention has the following structure:

1. An apparatus for manufacturing a layered product in which a decorative material is laminated on a surface and a side face of a base material, characterized by comprising: a cutting unit that forms a first cut portion on a cornering side of the base material and also forms a second cut portion, which includes an arc-shaped portion, on a rear surface side of the decorative material at such a part that corresponds to the first cut portion; and a bending member that bends the decorative material at the arc-shaped portion in the second cut portion.

2. The apparatus for manufacturing the layered product according to 1 above, wherein the cutting unit includes a cutting tool that has a cutting blade having a first cutting plane that forms the first cut portion by cutting the cornering side of the base material and a second cutting plane that forms the second cut portion by cutting the rear surface side of the decorative material, and a part of the second cutting plane that is connected to the first cutting plane is formed to be an arc-shaped plane.

3. The apparatus for manufacturing the layered product according to 2 above, wherein a curvature radius of the arc-shaped plane is in a range of 1 millimeter to 3 millimeters.

4. The apparatus for manufacturing the layered product according to claim 1, further comprising a conveying unit that conveys the base material and the decorative material, in a state where the decorative material is fixed to a surface of the base material.

5. The apparatus for manufacturing the layered product according to 4 above, wherein the cutting unit further comprises a first guiding member that guides a side face of the base material being conveyed by the conveying unit, a second guiding member that guides a front surface of the decorative material being opposite to a side to which the base material is fixed, and a third guiding member that guides a rear surface, which is the side to which the base material is fixed, of a bending margin of the decorative material conveyed by the conveying unit.

6. The apparatus for manufacturing the layered product according to 4 above, wherein the cutting unit further comprises a first guiding member that guides a side face of the base material conveyed by the conveying unit, and a third guiding member that guides a rear surface, which is a side to which the base material is fixed, of a bending margin of the decorative material conveyed by the conveying unit.

7. The apparatus for manufacturing the layered product according to 5 above, wherein the cutting unit further comprises a supporting mechanism that supports the first guiding member, the second guiding member, the third guiding member and a cutting tool in a manner that positions thereof can be changed so that a cut depth (D) of the base material is alterable.

8. The apparatus for manufacturing the layered product according to 1 above, wherein the bending member is a stick-like member.

9. A method for manufacturing a layered product in which a decorative material is laminated on a surface and a side face of a base material, characterized by comprising: a cut portion forming step of forming a first cut portion on a cornering side of the base material and also forming a second cut portion, which includes an arc-shaped portion, on a rear surface side of the decorative material at such a part that corresponds to the first cut portion; and a bending step of bending the decorative material at the arc-shaped portion in the second cut portion.

10. The method for manufacturing the layered product according to 9 above, wherein in the cut portion forming step, the first cut portion and the second cut portion are simultaneously formed by cutting the base material and the decorative material, using a cutting tool.

11. The method for manufacturing the layered product according to 9 above, wherein a curvature radius of the arc-shaped portion is in a range of 1 millimeter to 3 millimeters.

12. The method for manufacturing the layered product according to 9 above, wherein the cut portion forming step and the bending step of bending the decorative material are performed while the base material and the decorative material are being conveyed in a state where the decorative material is fixed to the surface of the base material.

13. The method for manufacturing the layered product according to 12 above, wherein in the cut portion forming step, the first cut portion and the second cut portion are formed in a state where a side face of the base material being conveyed, a front surface of the decorative material being opposite to a side to which the base material is fixed, and a rear surface, which is the side to which the base material is fixed, of a bending margin of the decorative material being conveyed are guided.

14. The method for manufacturing the layered product according to 12 above, wherein in the cut portion forming step, the first cut portion and the second cut portion are formed in a state where a side face of the base material being conveyed and a rear surface, which is a side to which the base material is fixed, of a bending margin of the decorative material being conveyed are guided.

15. The method for manufacturing the layered product according to 13 above, wherein in the cut portion forming step, guiding positions of the base material and the decorative material and also a cut depth (D) of the base material are alterable.

16. The method for manufacturing the layered product according to 9 above, wherein in the bending step of bending the decorative material, the decorative material is bent using a stick-like member.

17. A layered product in which a decorative material is laminated on a surface and a side face of a base material, characterized in that a first cut portion is formed on a cornering side of the base material, that a second cut portion including an arc-shaped portion is formed on a rear surface side of the decorative material at such a part that corresponds to the first cut portion, and that the decorative material is bent at the arc-shaped portion in the second cut portion.

18. The layered product according to 17 above, wherein a curvature radius of the arc-shaped portion is in a range of 1 millimeter to 3 millimeters.

19. A cutting tool used for manufacturing a layered product in which a decorative material is laminated on a surface and a side face of a base material, characterized in that the cutting tool comprises a cutting blade having a first cutting plane for cutting a cornering side of the base material to a surface of which the decorative material is fixed and a second cutting plane for cutting a rear surface side of the decorative material at such a part that corresponds to a first cut portion, and that an arc-shaped plane is formed at such a part of the second cutting plane that is connected to the first cutting plane.

20. The cutting tool according to 19 above, wherein a curvature radius of the arc-shaped plane is in a range of 1 millimeter to 3 millimeters.

Effect of the Invention

With the arrangement of the apparatus for manufacturing a layered product according to the present invention, the cutting unit forms the first cut portion on a cornering side of the base material and also forms the second cut portion, which includes the arc-shaped portion, on a rear surface side of the decorative material. Further, the bending member bends the decorative material at the arc-shaped portion in the second cut portion. Thus, the layered product in which the decorative material is laminated on a surface and a side face of the base material is obtained. With this arrangement, the decorative material is bent at the arc-shaped portion in the second cut portion while the stress is being distributed. Consequently, it is possible to obtain the layered product of which the curvature radius at the curved portion is extremely small while reducing the ratio of having defective products. Especially, even in the case where the curvature radius value of the curved portion of the layered product needs to be changed, it is possible to eliminate cumbersome and complicated operation such as to adjust the positional arrangement of the bending member to a requisite minimum level (substantially to none). Furthermore, it is not necessarily to have the space between the first cut portion in the base material and the second cut portion in the decorative material filled with an adhesive agent.

With the arrangement in which the cutting unit includes the cutting tool that has the cutting blade having the first cutting plane and the second cutting plane, and the part of the second cutting plane that is connected to the first cutting plane is formed to be the arc-shaped plane, it is possible to form the first cut portion and the second cut portion simultaneously. Thus, it is possible to improve the manufacturing efficiency.

With the arrangement in which the curvature radius of the arc-shaped plane is in the range of 1 millimeter to 3 millimeters, the curvature radius of the arc-shaped portion in the second cut portion is arranged to be in the range of 1 millimeter to 3 millimeters. Thus, it is possible to bend the decorative material with the extremely small curvature radius with a higher degree of certainty.

With the arrangement in which the manufacturing apparatus further includes the conveying unit, while the base material and the decorative material are being conveyed in a state where the decorative material is fixed to the surface of the base material, it is possible to form the first cut portion and the second cut portion and also to bend the decorative material. Especially, in the case where the decorative material is fixed to an upper surface of the base material, so that the materials are conveyed while the base material is at the bottom and the decorative material is at the top, it is possible to prevent the surface of the decorative material from being damaged more effectively than in the case where an integrated article of the base material and the decorative material is conveyed in a state where the base material is fixed to the upper surface of the decorative material. Also, it is possible to convey the base material and the decorative material smoothly without reversing sides of the base material and the decorative material, from a step for integrating the base material and the decorative material to a step for forming the cut portions.

With the arrangement in which the cutting unit further includes the first guiding member, the second guiding member and the third guiding member, it is possible to arrange the cutting tool to be at a more precisely-determined position with respect to the base material and the decorative material, using the first guiding member, the second guiding member and the third guiding member. Thus, it is possible to form the first cut portion and the second cut portion more accurately. Because the bending margin of the decorative material is guided by the third guiding member, it is possible to structure the cutting unit more simply and more economically than in the case where the bending margin of the decorative material is attached by suction, for example.

With the arrangement in which the cutting unit further includes the first guiding member and the third guiding member, it is possible to arrange the cutting tool to be at a more precisely-determined position with respect to the base material and the decorative material, using the first guiding member and the third guiding member. Thus, it is possible to form the first cut portion and the second cut portion more accurately. Because the bending margin of the decorative material is guided by the third guiding member, it is possible to structure the cutting unit more simply and more economically than in the case where the bending margin of the decorative material is attached by suction, for example.

Further, with the arrangement in which the cutting unit further includes the supporting mechanism that supports the first guiding member, the second guiding member, the third guiding member and the cutting tool in a manner that their positions can be changed, it is possible to alter the guiding positions of the first guiding member, the second guiding member and the third guiding member with respect to the base material and the decorative material and also to alter the cut depth of the base material according to, for example, the curvature radius value at the curved portion of the layered product. As a result, by using the single cutting tool, it is possible to obtain a plurality of types of layered products having mutually different curvature radii at their respective curved portions.

With the arrangement in which the bending member is a stick-like member, it is possible to bend the decorative material with an extremely small curvature radius with a higher degree of certainty. Also, it is possible to structure the bending member, and thereby the whole apparatus, more simply and more economically.

With the arrangement of the method for manufacturing a layered product according to the present invention, firstly, the first cut portion is formed on the cornering side of the base material and also the second cut portion, which includes the arc-shaped portion, is formed on the rear surface side of the decorative material. Next, the decorative material is bent at the arc-shaped portion in the second cut portion. Thus, the layered product in which the decorative material is laminated on the surface and the side face of the base material is obtained. With this arrangement, because the decorative material is bent at the arc-shaped portion in the second cut portion while the stress is being distributed. Consequently, it is possible to obtain the layered product of which the curvature radius at the curved portion is extremely small while reducing the ratio of having defective products. Especially, even in the case where the curvature radius value of the curved portion of the layered product needs to be changed, it is possible to eliminate cumbersome and complicated operation such as to adjust the positional arrangement of the bending member to the requisite minimum level (substantially to none). Furthermore, it is not necessarily to have the space between the first cut portion in the base material and the second cut portion in the decorative material filled with an adhesive agent.

With the arrangement in which, in the cut portion forming step, the first cut portion and the second cut portion are simultaneously formed by cutting the base material and the decorative material, using the cutting tool, it is possible to form the first cut portion and the second cut portion simultaneously. Thus, it is possible to improve the manufacturing efficiency.

With the arrangement in which the curvature radius of the arc-shaped portion is in the range of 1 millimeter to 3 millimeters, it is possible to bend the decorative material with the extremely small curvature radius with a higher degree of certainty.

Further, with the arrangement in which the cut portion forming step and the bending step are performed while the base material and the decorative material are being conveyed in a state where the decorative material is fixed to the surface of the base material, it is possible to form the first cut portion and the second cut portion and also to bend the decorative material while the base material and the decorative material are being conveyed. Especially, in the case where the decorative material is fixed to an upper surface of the base material, so that the materials are conveyed while the base material is at the bottom and the decorative material is at the top, it is possible to prevent the surface of the decorative material from being damaged more effectively than in the case where an integrated article of the base material and the decorative material is conveyed in a state where the base material is fixed to the upper surface of the decorative material. Also, it is possible to convey the base material and the decorative material smoothly without reversing sides of the base material and the decorative material, from a step for integrating the base material and the decorative material to a step for forming the cut portions.

With the arrangement in which, in the cut portion forming step, the first cut portion and the second cut portion are formed in a state where the side face of the base material, the surface of the decorative material and the rear surface of the bending margin of the decorative material are guided, it is possible to arrange the cutting tool to be at a more precisely-determined position with respect to the base material and the decorative material. Thus, it is possible to form the first cut portion and the second cut portion more accurately. Also, it is possible to structure the cutting unit more simply and more economically than in the case where the bending margin of the decorative material is attached by suction, for example.

With the arrangement in which, in the cut portion forming step, the first cut portion and the second cut portion are formed in a state where the side face of the base material, the surface of the decorative material and the rear surface of the bending margin of the decorative material are guided, it is possible to arrange the cutting tool to be at a more precisely-determined position with respect to the base material and the decorative material. Thus, it is possible to form the first cut portion and the second cut portion more accurately. Also, it is possible to structure the cutting unit more simply and more economically than in the case where the bending margin of the decorative material is attached by suction, for example.

Further, with the arrangement in which, in the cut portion forming step, the guiding positions of the base material and the decorative material and also the cut depth (D) of the base material are alterable, it is possible to alter the guiding positions of the first guiding member and the second guiding member with respect to the base material and the decorative material and also to alter the cut depth of the base material according to, for example, the curvature radius value at the curved portion of the layered product. As a result, by using the single cutting tool, it is possible to obtain a plurality of types of layered products having mutually different curvature radii at their respective curved portions.

Further, with the arrangement in which, in the bending step, the decorative material is bent, using the stick-like member, it is possible to bend the decorative material with a higher degree of certainty. Also, it is possible to structure the whole apparatus, more simply and more economically.

With the arrangement of the layered product according to the present invention, the decorative material is bent at the arc-shaped portion in the second cut portion so that the decorative material is laminated on the surface and the side face of the base material. With this arrangement, the decorative material is bent at the arc-shaped portion in the second cut portion while the stress is being distributed. Consequently, it is possible to obtain the layered product of which the curvature radius at the curved portion is extremely small while reducing the ratio of having defective products. Especially, even in the case where the curvature radius value of the curved portion of the layered product needs to be changed, it is possible to eliminate cumbersome and complicated operation such as to adjust the positional arrangement of the bending member to the requisite minimum level (substantially to none). Furthermore, it is not necessarily to have the space between the first cut portion in the base material and the second cut portion in the decorative material filled with an adhesive agent.

With the arrangement in which the curvature radius of the arc-shaped portion is in the range of 1 millimeter to 3 millimeters, it is possible to bend the decorative material with the extremely small curvature radius with a higher degree of certainty.

With the arrangement of the cutting tool according to the present invention, the first cutting plane cuts the cornering side of the base material so as to form the first cut portion, and at the same time, the second cut plane cuts the rear surface side of the decorative material so as to form the second cut portion having the arc-shaped portion.

With the arrangement in which the curvature radius of the arc-shaped plane is in the range of 1 millimeter to 3 millimeters, the curvature radius of the arc-shaped portion in the second cut portion is arranged to be in the range of 1 millimeter to 3 millimeters. Thus, it is possible to bend the decorative material with the extremely small curvature radius with a higher degree of certainty.

DESCRIPTION OF REFERENCE NUMERALS AND SIGNS

1; manufacturing apparatus, 2; conveyer mechanism, 3; cutting unit, 20; cutting tool, 21; first guiding roller, 22; second guiding roller, 25; cutting blade, 26; first cutting plane, 27; second cutting plane, 27b; arc-shaped plane, 32; stick-like member, 50; layered product, 51; base material, 52; decorative material, 53; first cut portion, 54; second cut portion, 54a; arc-shaped portion.

BEST MODE FOR CARRYING OUT THE INVENTION

1. A Layered Product

A layered product according to an embodiment of the present invention includes a base material and a decorative material as described below.

The layered product may be used as, for example, a material to be applied to the surface of furniture and building materials including a floor material, a wall material, a door material, a partition material, and a counter material.

Figure 11:
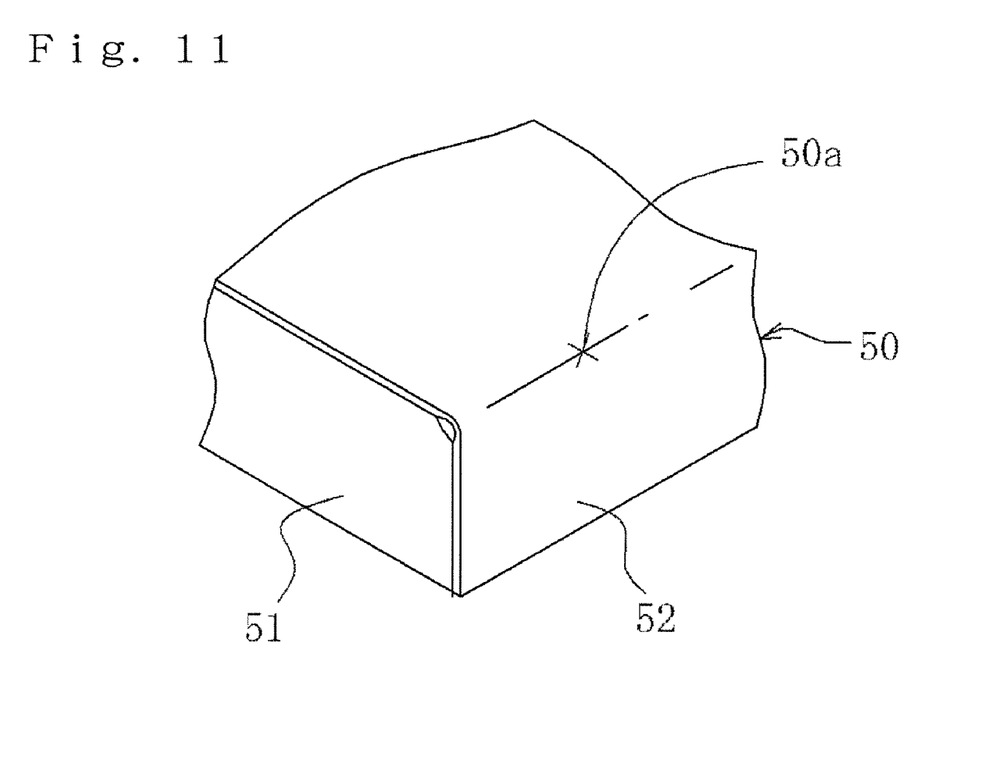
FIG. 11 is a perspective view of the main part of the layered product according to the embodiment.

The curvature radius at a curved portion 50a of a layered product 50 may be, for example, in the range of 1.5 millimeters to 3.5 millimeters (and preferably in the range of 2 millimeters to 3 millimeters) (See, FIG. 11).

The "base material" may be made of any material, may be in any shape, and may be in any size, as long as a first cut portion is formed on a cornering side of the base material.

The base material may be made of, for example, a particle board, a medium density fiberboard (MDF), a single wooden board, or plywood. In particular, particle boards are preferable in terms of their recyclability and low cost.

The "first cut portion" may be in any shape, and may be in any size. The cut depth D of the first cut portion (See, FIG. 5) may be selected appropriately in accordance with the value of the curvature radius at the curved portion of the layered product, or the like. To be more specific, when the cut depth D is large, the curved portion is arranged to have a relatively larger curvature radius, whereas when the cut depth D is small, the curved portion is arranged to have a relatively smaller curvature radius.

Figure 5:
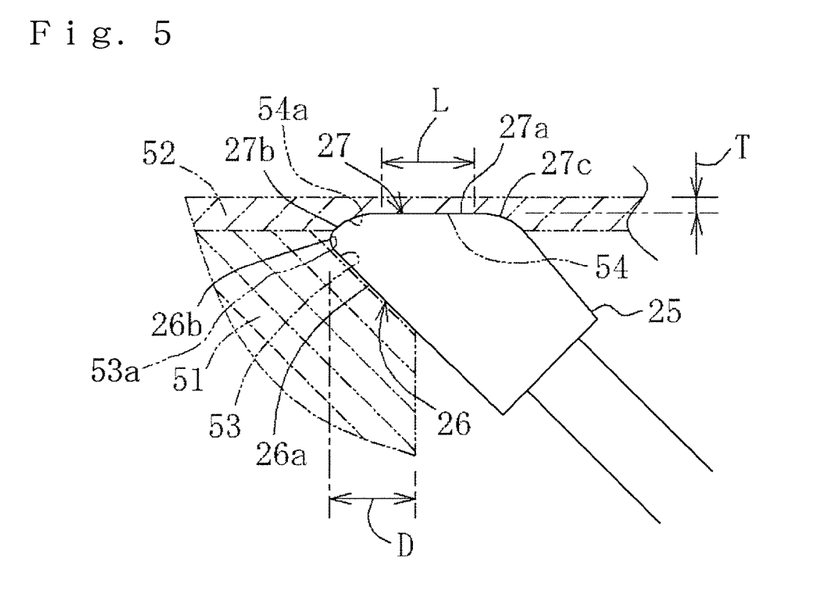
FIG. 5 is an enlargement view taken along the arrow V in FIG. 4.

A first cut portion 53 may include an arc-shaped portion 53a, for example (See, FIG. 5). The arc-shaped portion may be in any shape and may have any curvature radius value. Normally, the arc-shaped portion is formed at such a part of the first cut portion that is connected to an arc-shaped portion formed on one end of a second cut portion, which is described later.

The arc-shaped portion 53a may have an arc plane with one curvature radius or may have an arc plane with two or more mutually different curvature radii.

The curvature radius of the arc-shaped portion 53a may be arranged, for example, to be smaller than the curvature radius of the arc-shaped portion 54a formed within the second cut portion 54 described later. It is preferable to arrange the curvature radius of the arc-shaped portion 53a to be equal to or smaller than 2 millimeters, and particularly, to be equal to or smaller than 1 millimeter.

The "decorative material" may be made of any material, may be in any shape, and may be in any size, as long as the second cut portion is formed on the rear surface side of the decorative material at such a part that corresponds to the first cut portion.

The decorative material may be made of, for example, a thermosetting resin such as a melamine resin, a DAP resin, or a polyester resin. As the decorative material, a metallic decorative material may be used, which is obtained by laminating a resin sheet on a metal foil or by laminating resin layers on both sides of a metal foil. The thickness of the decorative material made of a thermosetting resin may be approximately in the range of 0.8 millimeter to 1.2 millimeters.

The decorative material may have a structure with a single layer or a structure with a plurality of layers.

The "second cut portion" may be in any shape, and may be in any size, as long as the second cut portion has an arc-shaped portion. The thickness T (See, FIG. 5) of the thin portion of the decorative material resulting from the formation of the second cut portion may be selected appropriately in accordance with the material of which the decorative material is made, the thickness of the decorative material, and the like. The cut length L (See, FIG. 5) of the flat plane portion of the second cut portion other than the arc-shaped portion may be selected appropriately in accordance with the curvature radius value of the curved portion of the layered product, and the like. It is preferable to have an arrangement wherein the midpoint of the cut length L substantially coincides with the phase of the side face of the base material.

The "arc-shaped portion" may be in any shape and may have any curvature radius value, as long as it is possible to bend the decorative material with an extremely small curvature radius without fail. Normally, the arc-shaped portion 54a is formed at such a part of a second cut portion 54 that is connected to one end of the first cut portion 53 (See, FIG. 5).

The arc-shaped portion may have an arc plane with one curvature radius or may have an arc plane with two or more mutually different curvature radii.

It is preferable to arrange the curvature radius of the arc-shaped portion to be in the range of 1 millimeter to 3 millimeters, and more preferably in the range of 1.2 millimeters to 2.8 millimeters, and particularly, in the range of 1.5 millimeters to 2 millimeters. These dimensions are selected for the following reasons: When the curvature radius is equal to or larger than 1 millimeter, it is possible to prevent the blade edge of a cutting tool from being damaged. When the curvature radius is equal to or smaller than 3 millimeters, it is possible to bend the decorative material with an extremely small curvature radius with a higher degree of certainty.

2. An Apparatus for Manufacturing a Layered Product

The apparatus for manufacturing a layered product according to the present embodiment includes a cutting unit and a bending member that are described below. For example, the layered product manufactured with this apparatus may have the configuration defined in section 1 of the embodiment described above.

The apparatus for manufacturing the layered product may further include, for example, a conveying unit described below.

The "cutting unit" may have any structure and may form the cut portions in any manner, as long as the cutting unit is configured to form the first cut portion on the cornering side of the base material and also to form the second cut portion on the rear surface side of the decorative material at such a part that corresponds to the first cut portion.

The cutting unit may include, for example, a cutting tool that has one cutting blade or two or more cutting blades. Each cutting blade has a first cutting plane and a second cutting plane, as described below.

The "first cutting plane" may be in any shape and may be in any size as long as the first cutting plane is able to cut the cornering side of the base material so as to form the first cut potion. A part of a first cutting plane 26 that is connected to one end of a second cutting plane 27 may be formed to be an arc-shaped plane 26b (See, FIG. 5). The arc-shaped plane 26b prevents the blade edge of a cutting tool from being damaged.

For example, the arc-shaped plane 26b may have an arc plane with one curvature radius or may have an arc plane with two or more mutually different curvature radii.

The curvature radius of the arc-shaped plane 26b may be arranged, for example, to be smaller than the curvature radius of the arc-shaped plane 27b formed in the second cutting plane 27 described later. It is preferable to arrange the curvature radius of the arc-shaped plane 26b to be equal to or smaller than 2 millimeters, and particularly, to be equal to or smaller than 1 millimeter.

The "second cutting plane" may be in any shape and may be in any size as long as the second cutting plane is able to cut the rear surface side of the base material so as to form the second cut potion. A part of the second cutting plane 27 that is connected to one end of the first cutting plane 26 is formed to be an arc-shaped plane 27b (See, FIG. 5).

The arc-shaped plane 27b may be in any shape and may have any curvature radius value, as long as the arc-shaped plane 27b is able to form the arc-shaped portion in the second cut portion. For example, the arc-shaped plane 27b may have an arc plane with one curvature radius or may have an arc plane with two or more mutually different curvature radii. It is preferable to arrange the curvature radius of the arc-shaped plane 27b to be in the range of 1 millimeter to 3 millimeters, and more preferably in the range of 1.2 millimeters to 2.8 millimeters, and particularly, in the range of 1.5 millimeters to 2 millimeters. These dimensions are selected so that the arc-shaped portion in the second cut portion is arranged to have a predetermined curvature radius value (for example, in the range of 1 millimeter to 3 millimeters.).

The length L (See, FIG. 5) of the flat plane of the second cutting plane other than the arc-shaped plane may be, for example, in the range of 3.2 millimeters to 4 millimeters (and preferably in the range of 3.4 millimeters to 3.8 millimeters).

The thickness T (See, FIG. 5) of the thin portion of the decorative material resulting from the cutting by the second cutting plane may be, for example, in the range of 0.2 millimeter to 0.8 millimeter (and preferably in the range of 0.4 millimeter to 0.6 millimeter).

The cutting process with the use of the cutting tool is normally performed in a state where the decorative material in a flat-sheet form is fixed to the surface of the base material and while the bending margin of the decorative material is overhanging from the surface of the base material.

The "bending member" may have any structure and may bend the decorative material in any manner, as long as the bending member is able to bend the decorative material at the arc-shaped portion in the second cut portion.

The bending member may be, for example, one or a plurality of a stick-like member, a guiding roller, a guiding pad, or the like. It is preferable to use a stick-like member in terms of its simple structure and low cost. The stick-like member may be provided, for example, at an angle with respect to the conveyance direction.

The "conveying unit" may have any structure and may convey the materials in any manner, as long as the conveying unit is able to convey the base material and the decorative material in a state where the decorative material is fixed to the surface of the base material. In this case, the cutting unit and the bending member are normally disposed side by side, along the conveyance path of the conveying unit. The conveying unit may convey the materials in one of the following manners: For example, (1) The conveying unit conveys the base material and the decorative material in a state where the decorative material is fixed to an upper surface of the base material, while the base material is at the bottom and the decorative material is at the top; (2) The conveying unit conveys the base material and the decorative material in a state where the decorative material is fixed to the lower surface of the base material, while the decorative material is at the bottom and the base material is at the top.

The conveying unit may be, for example, any one of various types of conveyer mechanisms, a conveying carriage, a robot hand.

The base material and the decorative material may be fixed to each other in any manner; however, they are normally adhered to each other.

Figure 2:
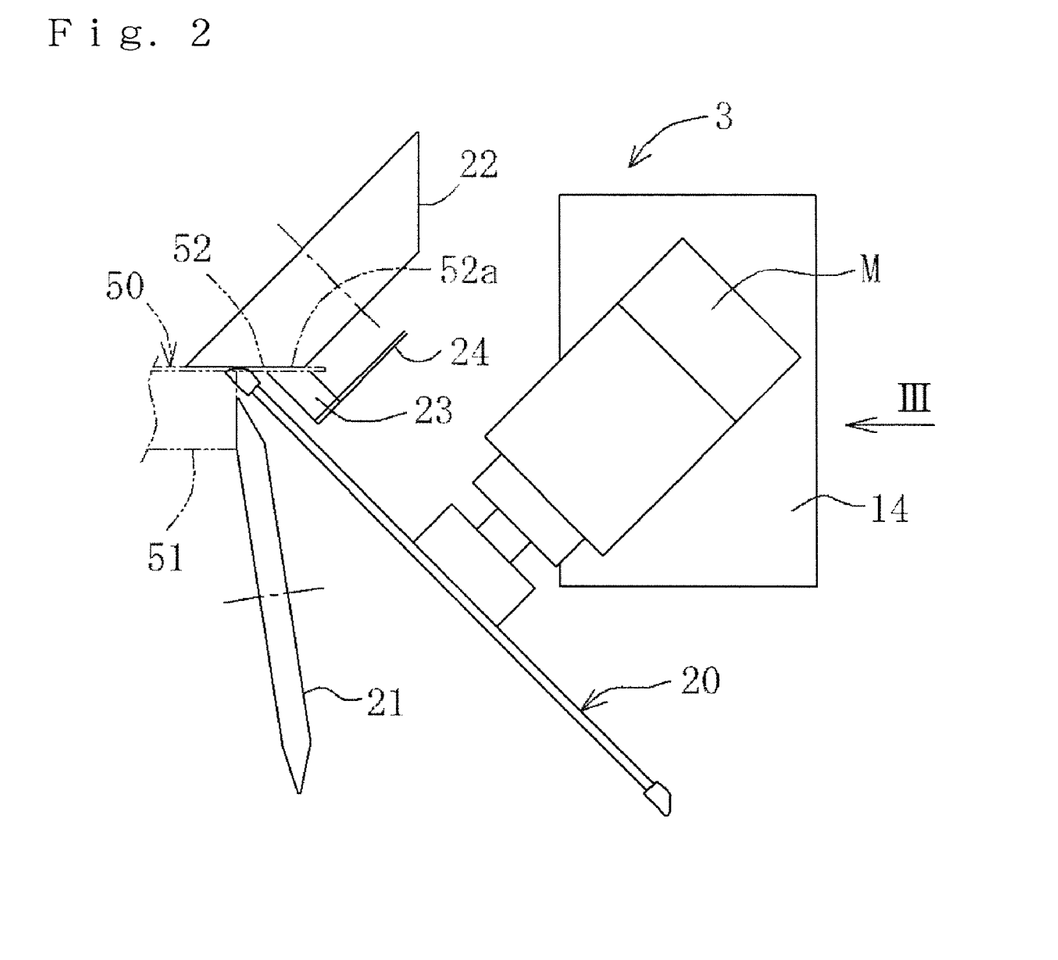
FIG. 2 is a side view of a cutting unit according to the embodiment.

In the case where the manufacturing apparatus includes the conveying unit, the cutting unit may include, for example, a cutting tool 20, which may be the one mentioned above, a first guiding member 21 that guides the side face of the base material being conveyed by the conveying unit, a second guiding member 22 that guides the surface of the decorative material being opposite to the side on which the base material is fixed (See, FIG. 2). The first guiding member 21 and the second guiding member 22 may be, for example, a tracing roller, a ball, a surface sliding member, or the like.

The cutting tool 20 may be provided between the first guiding member 21 and the second guiding member 22. With this arrangement, it is possible to arrange the cutting tool 20 to be at a more precisely-determined position with respect to the base material and the decorative material. Thus, it is possible to form the first cut portion and the second cut portion more accurately.

The cutting unit may include, for example, a third guiding member 23 that guides the surface (i.e. the rear surface), which is on the side to which the base material is fixed, of the bending margin of the flat-sheet decorative material (See, FIG. 2), in addition to the cutting tool 20, the first guiding member 21, and the second guiding member 22. With this arrangement, it is possible to arrange the cutting tool 20 to be at a more precisely-determined position with respect to the base material and the decorative material. The third guiding member 23 may be, for example, a surface sliding member, a tracing roller, a ball, or the like. In addition, the third guiding member 23 may be supported by a resilient member like a leaf spring, or may be supported by a movable member like a piston rod in a cylinder, for example. With this arrangement, it is possible to press and guide, with a predetermined suppress strength, the surface of the bending margin of the decorative material.

It should be noted that, in the case where the conveying unit (especially, the conveyer mechanism) uses the conveying manner described in (1) above, it is preferable to have an arrangement in which the cutting unit includes the first guiding member, 21, the second guiding member 22, and the third guiding member 23. Alternatively, in the case where the conveying unit (especially, the conveyer mechanism) uses the conveying manner described in (2) above, it is preferable to have an arrangement in which the cutting unit includes the first guiding member, 21 and the third guiding member 23.

In order to be able to alter the cut depth in the base material, for example, the cutting unit may further include a supporting mechanism that supports the first guiding member 21, the second guiding member 22, the third guiding member 23, and the cutting tool 20 in a manner that their positions can be changed. The supporting mechanism normally supports the first guiding member 21, the second guiding member 22, the third guiding member 23, and the cutting tool 20 in a manner that their positions can be changed and also their positions can be determined.

The supporting mechanism may include, for example, a supporting member 10; a first moving member 1 that is supported by the supporting member 10 in a manner that the first moving member 1 is movable in forward and backward directions; a ball screw mechanism 12 that is provided between the supporting member 10 and the first moving member 1 and moves the first moving member 11 in forward and backward directions; a second moving member 13 that is supported by the first moving member 11 in a manner that the second moving member 13 is movable in forward and backward directions; a driving cylinder 15 that moves the second moving member 13 in forward and backward directions; a third moving member 14 that is supported by the second moving member 13 in a manner that the third moving member 14 is movable in upward and downward directions; and a driving cylinder 16 that moves the third moving member 14 in upward and downward directions. The third moving member 14 may be configured so that a driving motor M to which the cutting tool 20 is fixed on the driving shaft thereof, a supporting member that supports the first guiding member 21 by the axis, and another supporting member that supports the second guiding member 22 by the axis, and the third guiding member 23 are fixed to the third moving member 14 (See, FIG. 2 and FIG. 3).

The apparatus for manufacturing the layered product may further include, for example, an applying unit that applies an adhesive agent to the first cut portion and the second cut portion formed by the cutting unit. Also, the apparatus for manufacturing the layered product may further include, for example, a heating unit that heats the decorative material in which the second cut portion is formed by the cutting unit.

3. A Method for Manufacturing a Layered Product

The method for manufacturing a layered product according to the present embodiment include a cut portion forming step and a bending step that are described below. For example, the layered product manufactured with this method may have the configuration defined in section 1 in the embodiment described above.

The "cut portion forming step" may form the cut portions in any manner and may include any procedures, as long as the cut portion forming step is configured to form the first cut portion on the cornering side of the base material and also to form the second cut portion on the rear surface side of the decorative material at such a part that corresponds to the first cut portion.

It is preferable to have an arrangement in which, in the cut portion forming step, the first cut portion and the second cut portion are simultaneously formed with the use of one cutting tool. For example, the cutting tool may have the configuration of the cutting tool defined in section 2 of the embodiment described above. The cutting process with the use of the cutting tool is normally performed in a state where the decorative material in a flat-sheet form is fixed to the surface of the base material and while the bending margin of the decorative material is overhanging from the surface of the base material.

The "bending step" may bend the decorative material in any manner and may include any procedures, as long as the bending step is able to bend the decorative material at the arc-shaped portion in the second cut portion.

It is preferable to have an arrangement in which, in the bending step, the decorative material is bent, using a stick-like member.

It is preferable to have an arrangement in which the cut portion forming step and the bending step are performed while the base material and the decorative material are being conveyed in a state where the decorative material is fixed to the surface of the base material. For example, the unit used for conveying the base material may have the configuration of the conveying unit defined in section 2 of the embodiment described above.

In the case where the cut portion forming step and the bending step are performed while the base material and the decorative material are being conveyed, as noted above, for example, in the cut portion forming step, the first cut portion and the second cut portion may be formed in a state where a side face of the conveyed base material and the surface of the conveyed decorative material that is opposite to the side to which the base material is fixed are guided. Further, in the cut portion forming step, for example, the first cut portion and the second cut portion may be formed in a state where the surface (i.e. the rear surface), which is the side to which the base material is fixed, of the bending margin of the decorative material is guided, in addition to the side face of the conveyed base material and the surface of the conveyed decorative material being guided.

For example, the unit used for guiding the side face of the base material, the side face of the decorative material, and the rear surface of the bending margin of the decorative material may have the configuration of the guiding members that are defined in section 2 of the embodiment described above.

It is preferable to have an arrangement in which, in the cut portion forming step, the cut depth of the base material as well as the guiding positions of the base material and the decorative material are alterable.

The method for manufacturing the layered product may further include, for example, an applying step of applying an adhesive agent to the first cut portion and the second cut portion formed in the cut portion forming step. Also, the method for manufacturing the layered product may further include, for example, a heating step of heating the decorative material in which the second cut portion is formed in the cut portion forming step.

4. A Cutting Tool

The cutting tool according to the embodiment of the invention is used for manufacturing a layered product in which a decorative material is laminated on a surface and a side face of a base material. The cutting tool includes a cutting blade having a first cutting plane that cuts a cornering side of the base material to the surface of which the decorative material is fixed and a second cutting plane that cuts the rear surface side of the decorative material at such a part that corresponds to the first cut portion. A part of the second cutting plane that is connected to the first cutting plane is formed to be an arc-shaped plane.

The cutting process by the cutting tool is normally performed in a state where the decorative material in a flat-sheet form is fixed to the surface of the base material and while the bending margin of the decorative material is overhanging from the surface of the base material. For example, the layered product may have the configuration defined in section 1 of the embodiment described above. Also, for example, the cutting tool may have the configuration of the cutting tool defined in section 2 of the embodiment described above.

EXAMPLE

The following specifically describes an example of the present invention, with reference to the drawings. In this example, as an example of the "layered product" according to the present invention, a layered product 50 that has a curved portion 50a and in which a decorative material 52 is laminated on the surface and a side face of a base material 51 is used, as shown in FIG. 11. Also, in this example, the base material 51 is made of a particle board, whereas the decorative material 52 is made of a melamine resin and has a thickness of 1 millimeter.

(1) Configuration of the Apparatus for Manufacturing a Layered Product

Figure 1:
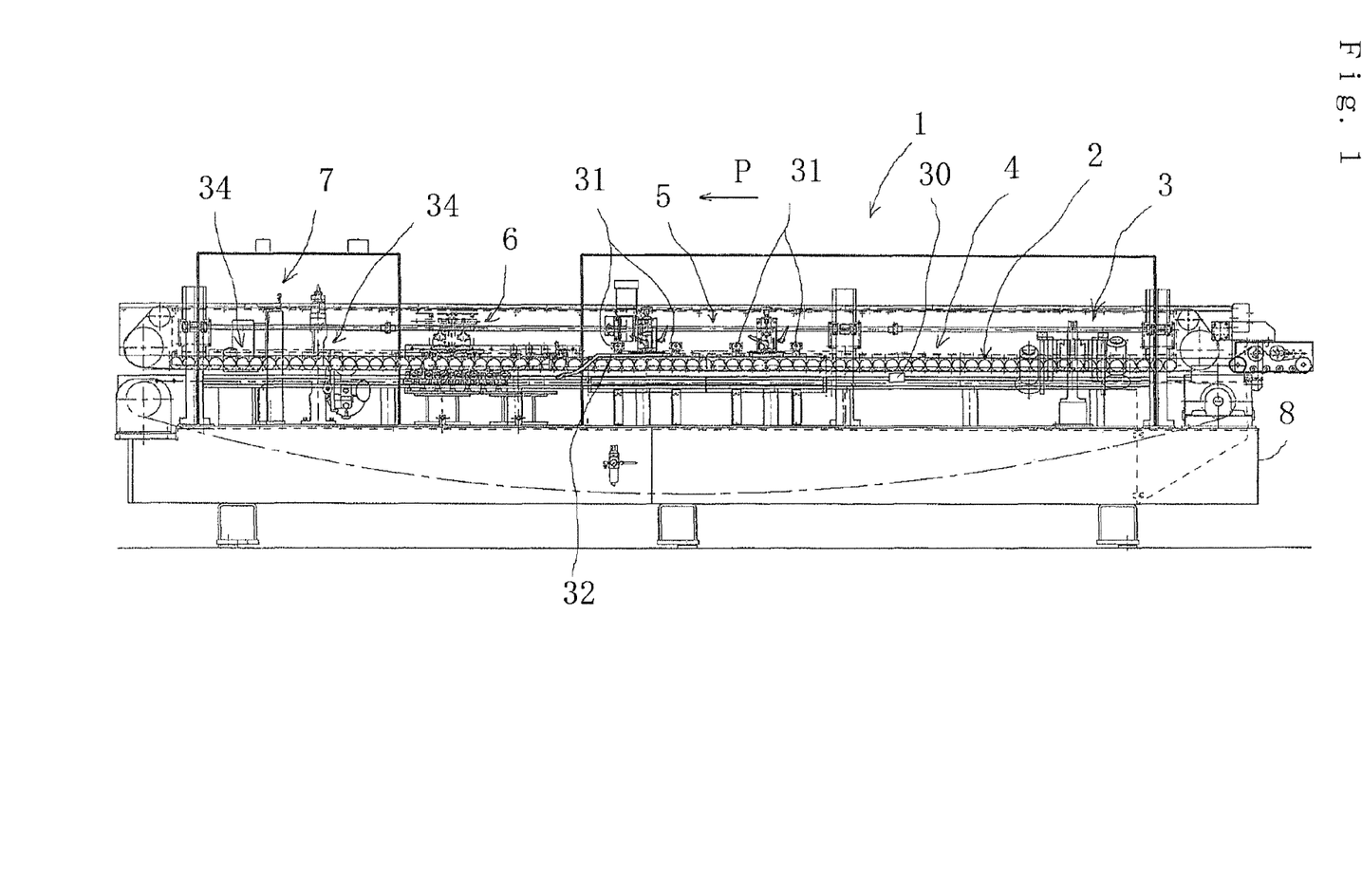
FIG. 1 is a side view of the entire manufacturing apparatus for a layered product according to an embodiment of the present invention.

As shown in FIG. 1, the apparatus 1 for manufacturing a layered product according to the present example includes a conveyer mechanism 2 (used as an example of the "conveying unit" according to the present invention) that is disposed so as to extend in a horizontal direction. An integrated article of the base material 51 and the decorative material 52 in a state that the decorative material 52 is adhered to the upper surface of the base material 51 is transferred from the upstream side of the conveyer mechanism 2 and is conveyed in the predetermined conveyance direction P.

A cutting unit 3, an applying unit 4, a heating unit 5, a roller mechanism 6, and a trimming unit 7 are disposed along the conveyer mechanism 2 one after another.

Figure 3:
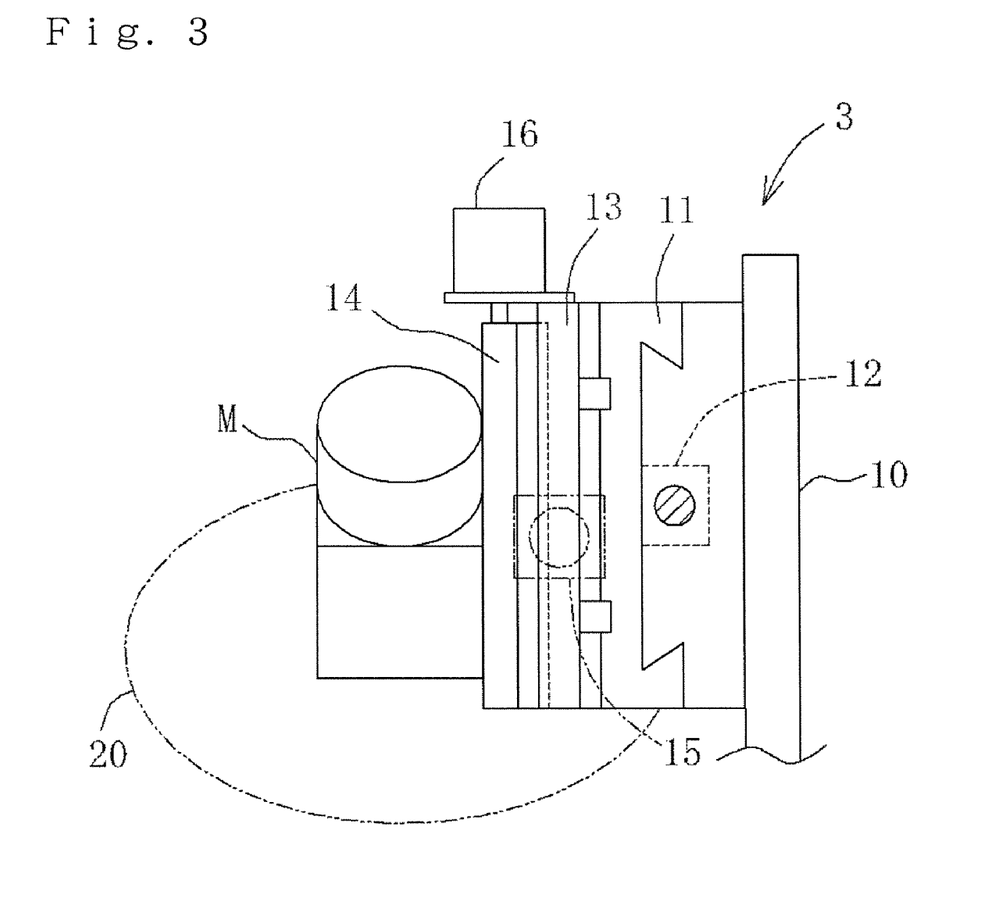
FIG. 3 is a view taken along the arrow III in FIG. 2.

As shown in FIG. 2 and FIG. 3, the cutting unit 3 includes the supporting member 10 that is fixed to a frame 8 (See, FIG. 1). The first moving member 11 is supported by the supporting member 10 in a manner that the first moving member 11 is movable in the forward and the backward directions (in the directions perpendicular to the plane of the drawing page).

The ball screw mechanism 12 is provided between the supporting member 10 and the first moving member 11. The screw shaft of the ball screw mechanism 12 is rotated by an operation handle (not shown in the drawing). By adjusting the ball screw mechanism 12, it is possible to adjust the position of the first moving member 11 with respect to the supporting member 10 in the forward and the backward directions. Thus, it is possible to alter the cut depth formed by the cutting tool described later.

The "supporting mechanism" according to the present invention is configured with the supporting member 10, the first moving member 11, and the ball screw mechanism 12, and the like.

The second moving member 13 is supported by the first moving member 11 in a manner that the second moving member 13 is movable in forward and backward directions. The third moving member 14 is supported by the second moving member 13 in a manner that the third moving member 14 is movable in upward and downward directions. The second moving member 13 moves in forward and backward directions as a result of an operation of the driving cylinder 15. The third moving member 14 moves in upward and downward directions as a result of an operation of the driving cylinder 16. With these arrangements, it is possible to change the position of the cutting tool, which is described later, between a cutting process position and a standby position.

The driving motor M is fixed to the third moving member 14. The cutting tool 20 is fixed to the driving shaft of the driving motor M. The supporting member (not shown in the drawing) that supports the first guiding roller 21 (used as an example of the "first guiding member" according to the present invention) by the axis is fixed to the third moving member 14, the first guiding roller 21 being configured to guide the side face of the base material 51 in a tracing manner. Also, the other supporting member (not shown in the drawing) that supports the second guiding roller 22 (used as an example of the "second guiding member" according to the present invention) by the axis is fixed to the third moving member 14, the second guiding roller 22 being configured to guide the upper surface of the decorative material 52 in a tracing manner In addition, the pressing guiding member 23 is fixed to the third moving member 14 via a leaf spring 24, the pressing guiding member 23 being configured to press and guide the rear surface of the bending margin 52a of the decorative material 52.

Figure 4:
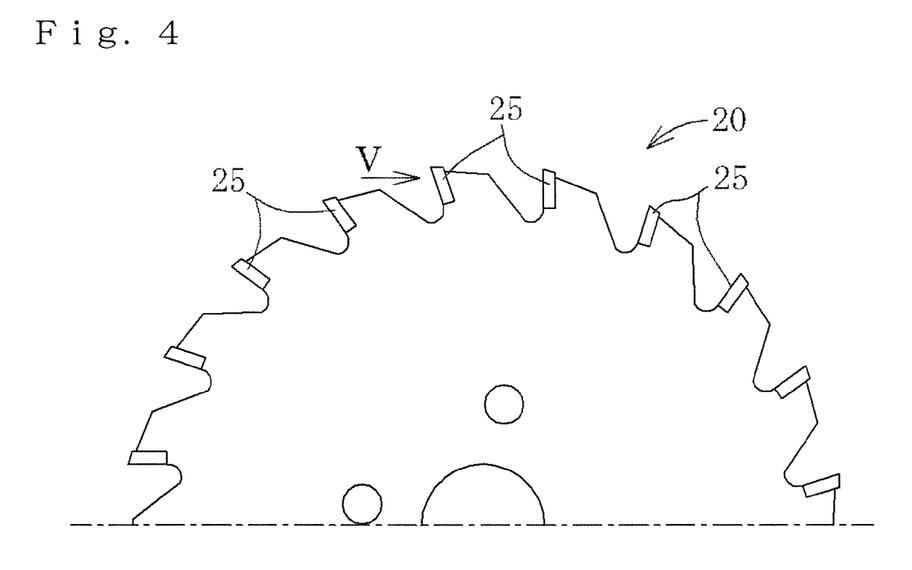
FIG. 4 is a front view of the main part of a cutting tool according to the embodiment.

As shown in FIG. 4, the cutting tool 20 according to the present example includes multiple (twenty, in this example) cutting blades 25. As shown in FIG. 5, each of the cutting blades 25 has the first cutting plane 26 and the second cutting plane 27 that intersect each other at a predetermined acute angle (approximately 45 degrees in the present example).

The first cutting plane 26 includes a flat plane 26a and the arc-shaped plane 26b that is connected to one end of the flat plane 26a and has a predetermined curvature radius (for example, 0.5 millimeter). The first cutting plane 26 cuts the cornering side of the base material 51 so as to form the first cut portion 53, which is in a chamfered shape, in the base material 51.

The second cutting plane 27 includes a flat plane 27a and the first arc-shaped plane 27b that is connected to one end of the flat plane 27a and has a predetermined curvature radius (for example, 2 millimeters) and a second arc-shaped plane 27c that is connected to the other end of the flat plane 27a and has a predetermined curvature radius (for example, 2 millimeters). The first arc-shaped plane 27b is connected to the arc-shaped plane 26b in the first cutting plane 26. The second cutting plane 27 cuts the rear surface side of the decorative material 52 so as to form the second cut portion 54 in the decorative material 52. In particular, the first arc-shaped plane 27b forms the arc-shaped portion 54a that is included in the second cut portion 54 and has a predetermined curvature radius (for example, 2 millimeters).

The length L of the flat plane 27a included in the second cutting plane 27 is arranged to be 3.6 millimeters. The thickness T of the thin portion of the decorative material 52 resulting from the cutting by the second cutting plane 27 is arranged to be 0.5 millimeter.

As shown in FIG. 1, the applying unit 4 includes an applying device 30 that applies a hot-melt adhesive 36 (See, FIG. 8) to the first cut portion 53 and the second cut portion 54 that have been cut and formed by the cutting unit 3.

As shown in FIG. 1, the heating unit 5 includes a plurality of heaters 31 that heat the upper surface of the decorative material 52. A stick-like member 32 (used as an example of the "bending member" according to the present invention) that is in the shape of a flat plate, is inclined along the conveyance direction P, and has a semicircular vertical section is provided on the downstream side of the heating unit 5. The decorative material 52 immediately after being heated is bent by the stick-like member 32 and laminated on the side face of the base material 51.

The roller mechanism 6 includes two pinch rollers.

The trimming unit 7 includes trimming units 34 at two places for trimming the end portions.

(2) Operation of the Apparatus for Manufacturing the Layered Product

Next, the operation of the apparatus 1 for manufacturing the layered product will be explained.

Figure 6:
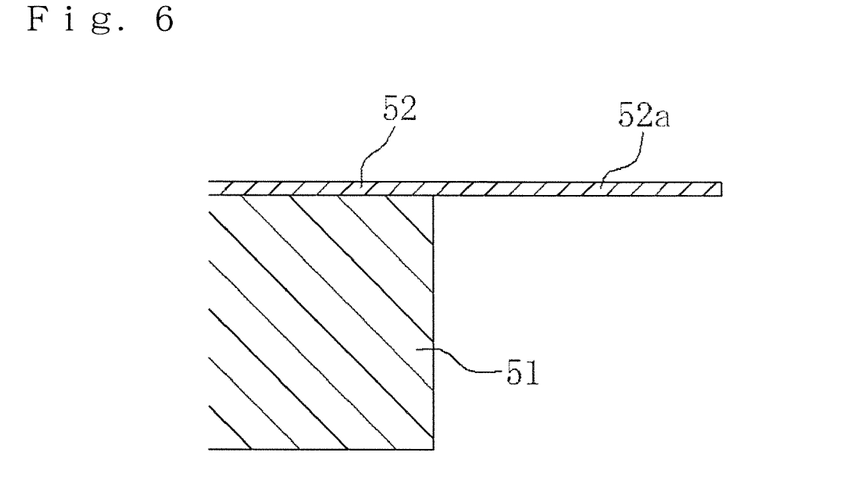
FIG. 6 is a view for explaining the operation when a base material and a decorative material are being conveyed.
Figure 7:
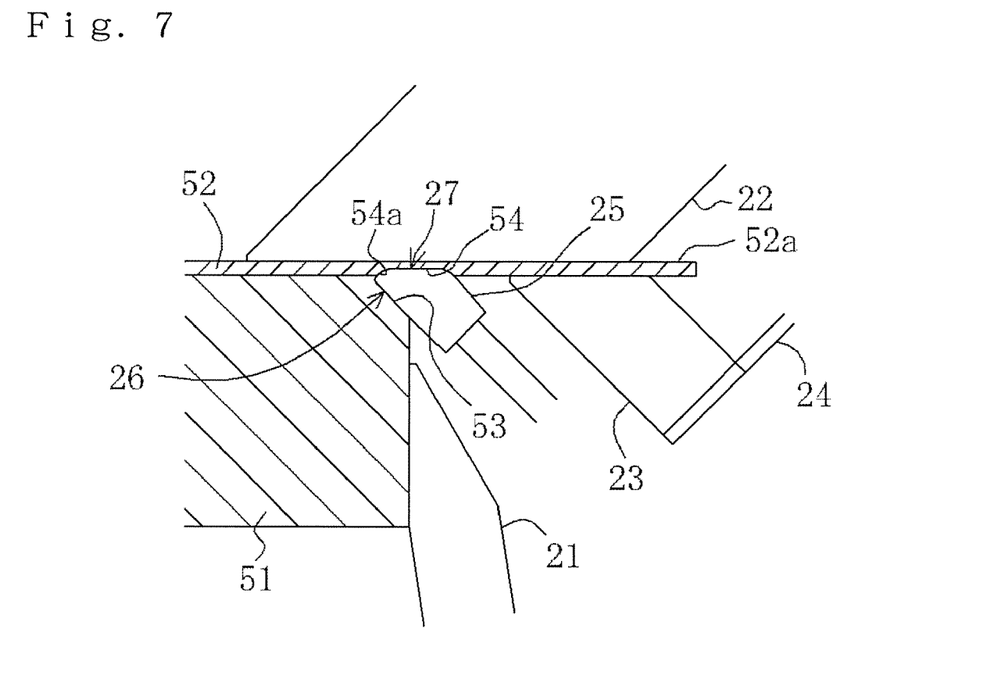
FIG. 7 is a view for explaining the operation when the base material and the decorative material are being cut.

Firstly, as shown in FIG. 6, an integrated article of the base material 51 and the decorative material 52 in a state where the decorative material 52 is adhered to the upper surface of the base material 51 is conveyed by the conveyer mechanism 2 along the conveyance direction P. When the integrated article is conveyed to the cutting unit 3, as shown in FIG. 7, the side face of the base material 51 is guided by the first guiding roller 21 in a tracing manner, whereas the upper surface of the decorative material 52 is guided by the second guiding roller 22 in a tracing manner, and also the rear surface of the bending margin 52a of the decorative material 52 is pressed and guided by the pressing guiding member 23. While the integrated article is being guided, the cutting tool 20, which is driven to rotate, cuts the cornering side of the base material 51 so as to form the first cut portion 53 and also cuts the rear surface side of the decorative material 52 so as to form the second cut portion 54.

Figure 8:
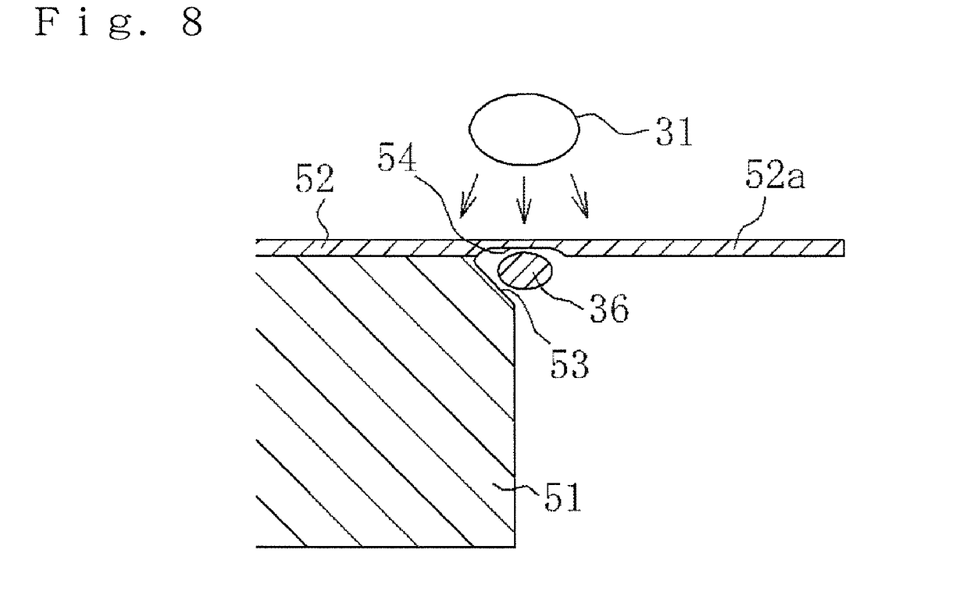
FIG. 8 is a view for explaining the operation when the decorative material is being heated.
Figure 9:
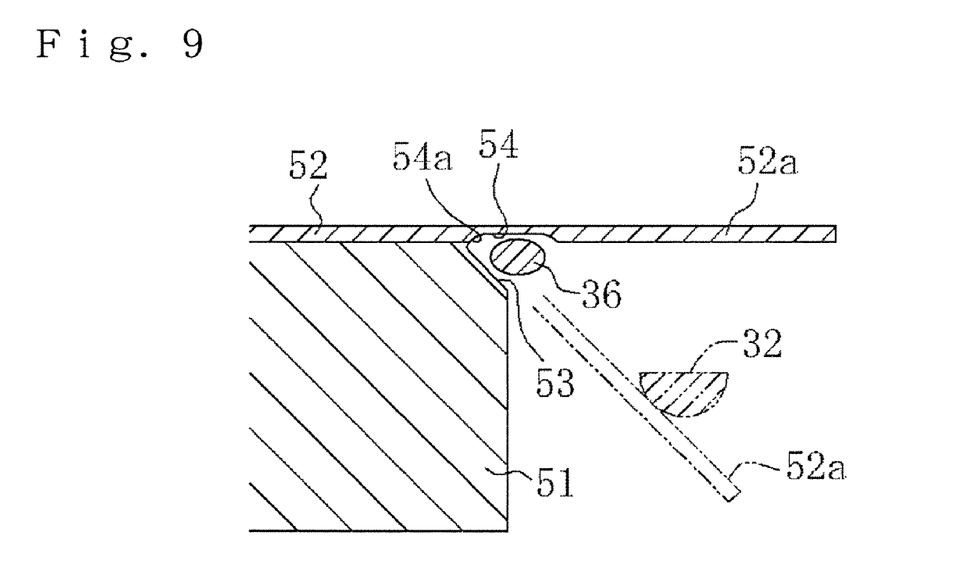
FIG. 9 is a view for explaining the operation when the decorative material is being bent.
Figure 10:
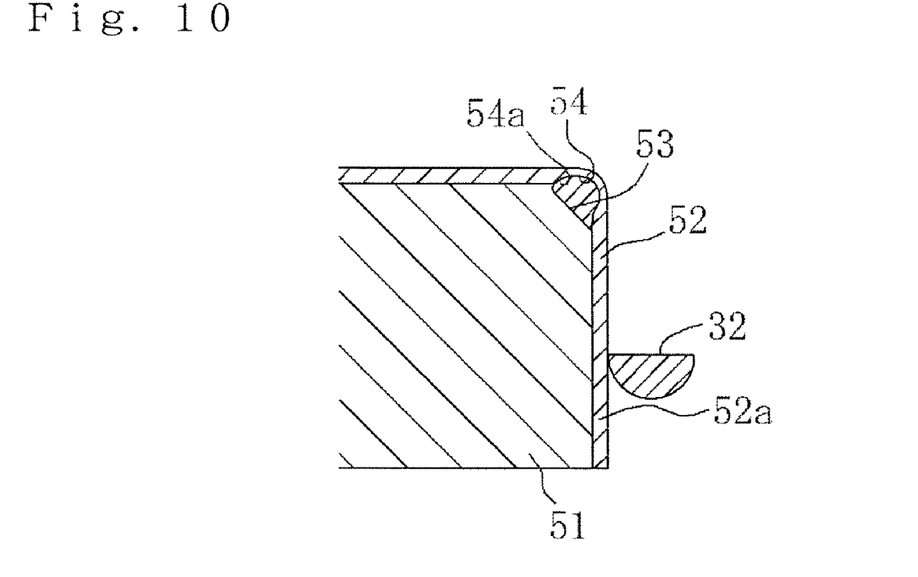
FIG. 10 is a view for explaining the operation when the decorative material has been bent.

Next, when the integrated article is conveyed to the applying unit 4, as shown in FIG. 8, the hot-melt adhesive 36 is applied to the first cut portion 53 and the second cut portion 54. Subsequently, when the integrated article is conveyed to the heating unit 5, the upper surface of the decorative material 52 is heated by the heaters 31 from above. Then, when the integrated article is conveyed to the downstream side of the heating unit 5, as shown in FIG. 9 with an imaginary line, the bending margin 52a of the decorative material 52 is bent by the stick-like member 32, and eventually the bending margin 52a of the decorative material 52 is laminated on the side face of the base material 51 (See, FIG. 10).

Subsequently, when the integrated article is conveyed to the roller mechanism 6, the structure goes through between the two series of pinch rollers. Then, the integrated article is conveyed to the trimming unit 7, and the end portions are trimmed by the trimming units 34. As a result, the layered product 50 (See, FIG. 11) that has the curved portion 50a with an extremely small curvature radius (for example, 3 millimeters) is obtained.

(3) Effects of the Example

As explained so far, according to the present example, the cutting tool 20 cuts the cornering side of the base material 51 so as to form the first cut portion 53, and also cuts the rear surface side of the decorative material 52 so as to form the second cut portion 5. The decorative material 52 is bent by the stick-like member 32 at the arc-shaped portion 54a (See, FIG. 9) in the second cut portion 54. Accordingly, when the decorative material 52 is bent, the stress is distributed appropriately at the arc-shaped portion 64a in the second cut portion 54. Thus, even if the curvature radius of the bending portion is arranged to be extremely small, it is possible to prevent the decorative material from being damaged. As a result, it is possible to obtain the layered product 50 that has the curved portion 50a with an extremely small curvature radius, while reducing the ratio of having defective products (for example, damages and linear marks on the decorative material) by a considerably amount compared to a product according to the related art in which the cut portion in the decorative material has a corner portion at which the planes intersect each other. Especially, even in the case where the curvature radius value of the curved portion of the product (the layered product 50) needs to be changed, it does not require cumbersome and complicated operation such as to adjust the positional arrangement of the stick-like member 32. Further, it is not necessarily required to have the space between the first cut portion 53 in the base material 51 and the second cut portion 54 in the decorative material 52 filled with an adhesive agent. In addition, because the second cut portion 54 is formed on the rear surface side of the decorative material 52, when the decorative material 52 is heated, the temperature of the thin portion of the decorative material 52 becomes higher more quickly than other portions. Thus, it is possible to heat only the bending portion efficiently. Consequently, it is possible to keep the loss of the glossiness of the decorative material 52 due to the heat, to a minimum level. The application of the hot-melt adhesive 36 to the first cut portion 53 and the second cut portion 54 also provides a similar advantage. Furthermore, applying the adhesive to the bending portion also helps to maintain the strength of the product.

In the post form processing according to the related art, the base material requires a curving process and a sanding finish; however, the manufacturing apparatus 1 according to the present invention does not require them. Thus, it is possible to achieve both reduction of the cutting amount and improvement of the yield of the materials. Further, it is possible to reduce processing noise and the like and to realize a good working environment. Furthermore, it is possible to configure the manufacturing apparatus 1 as a whole with a simple and economical structure. Because the manufacturing apparatus 1 can be structured more compact, it is possible to reduce the space required for the processing. In the post form processing according to the related art, every time the curvature radius of the curved portion of a layered product is changed, the setting of the press roller and the setting of the guiding pad need to be changed. However, the manufacturing apparatus 1 of the present invention does not require them. Consequently, it is possible to keep the cumbersome and complicated preparation procedure to a requisite minimum.

According to the present example, because each of the cutting blades 25 in the cutting tool 20 has the first cutting plane 26 and the second cutting plane 27, it is possible to form the first cut portion 53 and the second cut portion 54 simultaneously, using only the single cutting tool 20. Thus, it is possible to improve the manufacturing efficiency. Also, according to the present example, while the integrated article of the base material 51 and the decorative material 52 is conveyed by the conveyer mechanism 2 in a state where the decorative material 52 is fixed to the upper surface of the base material 51, the first cut portion 53 and the second cut portion 54 are formed, and also the decorative material 52 is bent. Thus, it is possible to prevent the surface of the decorative material 52 from being damaged or the like, more effectively than in the case where an integrated article made up of a base material and a decorative material is conveyed in a state where the base material is fixed to the upper surface of the decorative material. Further, it is possible to convey the base material and the decorative material smoothly without reversing sides of the base material and the decorative material, from a step for integrating the base material and the decorative material to a step for forming the cut portions.

According to the present example, the cutting process is performed while the base material 51 and the decorative material 52 are guided and supported by the first guiding roller 21, the second guiding roller 22, and the pressing guiding member 23. Thus, it is possible to arrange the cutting tool 20 to be at a more precisely-determined position with respect to the base material 51 and the decorative material 52. Thus, it is possible to form the first cut portion 53 and the second cut portion 54 more accurately.

Also, according to the present example, the third moving member 14 is configured so that the position thereof is adjustable in the forward and the backward directions with respect to the supporting member 10. Thus, it is possible to alter easily the cut depth D of the base material 51 with the use of the cutting tool 20, as well as the guiding positions of the first guiding roller 21, the second guiding roller 22, and the pressing guiding member 23. As a result, by using the single cutting tool 20, it is possible to obtain a plurality of types of layered products having mutually different curvature radii at their respective curved portions 50a. Furthermore, by changing the thickness T of the thin portion of the decorative material 52 formed by the cutting tool 20, it is possible to obtain the layered product 50 that has a wider range of curvature radius at the curved portion 50a.

The present invention is not limited to the example described above. The present invention may be implemented in embodiments to which various modifications are applied for different purposes and usage, within the scope of the present invention. To be more specific, although the present example uses the decorative material 52 made of a melamine resin as an example, the present invention is not limited to this. For example, a metallic decorative material including a metal foil (for example, an aluminum foil) may be used as the decorative material 52. In a case, it is preferable to omit the heating process of the decorative material performed by the heating unit 5 (or to perform the heating process at a low temperature) so that the scratch prevention film provided on the surface of the decorative material does not melt.

According to the present example, the first cut portion 53 and the second cut portion 54 are formed, using the single cutting tool 20; however, the present invention is not limited to this. For example, it is acceptable to configure the manufacturing apparatus so as to include a first cutting tool that forms the first cut portion 53 and a second cutting tool that forms the second cut portion 54.

Also, according to the present example, the integrated article of the base material 51 and the decorative material 52 is conveyed in a state where the decorative material 52 is fixed to the upper surface of the base material 51; however, the present invention is not limited to this. For example, it is acceptable to have an arrangement in which an integrated article of a base material and a decorative material is conveyed in a state where the base material is fixed to the upper surface of the decorative material.

Further, in the layered product according to the present example, it is acceptable to have an arrangement in which the decorative material is laminated on one surface or on both surfaces of the base material or in which the decorative material is laminated on one side face or on both side faces of the base material.

Furthermore, in the layered product according to the example, the curved portion 50a with an extremely small curvature radius is formed at one corner portion of the base material 51; however, the present invention is not limited to this. It is acceptable to form the curved portions 50a at two or more corner portions of the base material 51.

INDUSTRIAL APPLICABILITY

The present invention may be utilized as an art for manufacturing a layered product in which a decorative material is laminated on a surface and a side face of a base material. Particularly, the present invention may be appropriately used as an art for manufacturing a layered product to be applied to the surface of furniture and building materials including a floor material, a wall material, a door material, a partition material, and a counter material.

What is claimed is:

1. An apparatus for manufacturing a layered product in which a decorative material made of a thermosetting resin is laminated on a surface and a side face of a base material, comprising:
    a conveyer mechanism that conveys said base material and said decorative material in a state that said decorative material is fixed to an upper surface of said base material;
    a cutting unit that forms a first cut portion on a cornering side of said base material to be conveyed by said conveyer mechanism and also forms a second cut portion, which includes an arc-shaped portion, on a rear surface side of said decorative material at a part corresponding to said first cut portion; and
    a bending member that bends said decorative material at said arc-shaped portion in said second cut portion;
    wherein said cutting unit comprises a cutting tool which has a cutting blade having a first cutting plane that forms said first cut portion by cutting the cornering side of said base material and a second cutting plane that forms said second cut portion by cutting the rear surface side of said decorative material, and a part of said second cutting plane connected to said first cutting plane is formed to be an arc-shaped plane, and said cutting unit further comprises a first guiding roller which guides a side face of said base material being conveyed by said conveyer mechanism, a second guiding roller which guides an upper surface of said decorative material, a pressing guiding member which is supported by a resilient member and presses and guides a rear surface of a bending margin of said decorative material, and a supporting mechanism that supports said first guiding roller, said second guiding roller, said pressing guiding member, and said cutting tool in a manner that positions thereof can be changed so that a cut depth of said base material is alterable.

2. The apparatus for manufacturing the layered product according to claim 1,
    wherein said bending member is a stick-like member.

3. The apparatus for manufacturing the layered product according to claim 1,
    wherein said supporting mechanism comprises a supporting member, a first moving member which is supported by said supporting member in a manner that said first moving member is movable in forward and backward directions, a ball screw mechanism which is provided between said supporting member and said first moving member and moves said first moving member in forward and backward directions, a second moving member which is supported by said first moving member in a manner that said second moving member is movable in forward and backward directions, a driving cylinder which moves said second moving member in forward and backward directions, a third moving member which is supported by said second moving member in a manner that said third moving member is movable in upward and downward directions, and a driving cylinder which moves said third moving member in upward and downward directions, and
    wherein on said third moving member, a driving motor to which said cutting tool is fixed on the driving shaft thereof, a supporting member which supports said first guiding roller by the axis, and another supporting member which supports said second guiding roller by the axis, and said pressing guiding member are fixed.

4. The apparatus for manufacturing the layered product according to claim 3,
    wherein said bending member is a stick-like member.

5. A method for manufacturing a layered product in which a decorative material made of a thermosetting resin is laminated on a surface and a side face of a base material,
    the method comprising:
    a cut portion forming step for forming a first cut portion on a cornering side of said base material and also forming a second cut portion, which includes an arc-shaped portion, on a rear surface side of said decorative material at a part that corresponds to said first cut portion; and
    a bending step for bending said decorative material at said arc-shaped portion in said second cut portion;
    wherein said cut portion forming step performs cutting of said base material and said decorative material with a cutting tool to form said first cut portion and said second cut portion simultaneously,
    wherein said cut portion forming step and said bending step for bending said decorative material are performed while said base material and said decorative material are being conveyed in a state that said decorative material is fixed to the surface of said base material, and
    wherein said cut portion forming step is a step in which said first cut portion and said second cut portion are formed in a state that an upper surface of said decorative material is guided by a second guiding roller at the same time that a side face of said base material conveyed is guided by a first guiding roller, and a state that a rear surface of a bending margin of said decorative material is pressed and guided with a pressing guiding member supported by a resilient member, and is a step in which guiding positions of said first guiding roller and said second guiding roller with respect to said base material and said decorative material and also a cut depth of said base material are alterable.

6. The method for manufacturing the layered product according to claim 5,
    wherein said bending step for bending said decorative material is a step that said decorative material is bent using a stick-like member.

* * * * *